US010158570B2

(12) United States Patent
Moiseenko et al.

(10) Patent No.: US 10,158,570 B2
(45) Date of Patent: Dec. 18, 2018

(54) CARRYING TCP OVER AN ICN NETWORK

(71) Applicant: CISCO TECHNOLOGY, INC., San Jose, CA (US)

(72) Inventors: Ilya V. Moiseenko, Somerville, MA (US); David R. Oran, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 15/263,639

(22) Filed: Sep. 13, 2016

(65) Prior Publication Data
US 2017/0373975 A1 Dec. 28, 2017

Related U.S. Application Data

(60) Provisional application No. 62/353,342, filed on Jun. 22, 2016.

(51) Int. Cl.
H04L 12/46 (2006.01)
H04L 12/70 (2013.01)
H04L 12/745 (2013.01)
H04L 29/06 (2006.01)
H04L 29/12 (2006.01)

(52) U.S. Cl.
CPC ........ *H04L 45/748* (2013.01); *H04L 12/4633* (2013.01); *H04L 61/1511* (2013.01); *H04L 69/16* (2013.01); *H04L 69/22* (2013.01)

(58) Field of Classification Search
None
See application file for complete search history.

(56) References Cited

U.S. PATENT DOCUMENTS

| 2009/0285209 A1* | 11/2009 | Stewart | H04L 65/1069 370/389 |
| 2013/0332619 A1* | 12/2013 | Xie | H04L 67/2823 709/230 |
| 2016/0014215 A1 | 1/2016 | Oran et al. | |
| 2016/0036730 A1* | 2/2016 | Kutscher | H04L 45/38 370/401 |

(Continued)

OTHER PUBLICATIONS

Trossen, Dirk, et al., "IP Over ICN—The Better IP? An Unusual Take on Information—Centric Networking," EUCNC 2015 conference, Jul. 15, 2015, 5 pages https://arxiv.org/abs/1507.04221.

*Primary Examiner* — Duc T Duong

(57) ABSTRACT

Aspects of the disclosure are directed to systems, network nodes, and methods performed in a network node. A network node can host a TCP/ICN proxy for routing TCP packets through an ICN network. The network node can serve as a forward proxy or a reverse proxy. As a forward proxy, the network node can receive a first packet at the network node, the first packet compliant with a Transmission Control Protocol (TCP) protocol; encapsulate one or more TCP headers from the first packet into a payload field of a second packet, the second packet compliant with an Information Centric Networking (ICN) protocol; and transmit the second packet to a destination through an ICN network. As a reverse proxy, the network node can receive an ICN packet from an ICN network, decapsulate the ICN packet to its TCP components, and transmit the TCP packet through a TCP network.

35 Claims, 11 Drawing Sheets

(56) References Cited

U.S. PATENT DOCUMENTS

2017/0237660 A1\* 8/2017 Trossen ................. H04L 61/15
　　　　　　　　　　　　　　　　　　　　　　　370/392
2017/0302576 A1\* 10/2017 Townsley ............ H04L 45/7453
2018/0007116 A1\* 1/2018 Trossen ............ G06F 17/30876

\* cited by examiner

CARRYING TCP OVER AN ICN NETWORK

CROSS REFERENCE TO RELATED APPLICATION

This application claims the benefit of priority under 35 U.S.C. § 119(e) to U.S. Provisional Application Ser. No. 62/353,342, entitled "CARRYING TCP OVER AN ICN NETWORK," filed Jun. 22, 2016," Inventors ILYA V. MOISEENKO, ET AL. The disclosure of the prior application is considered part of (and is incorporated by reference in) the disclosure of this application.

FIELD

This disclosure pertains to carrying TCP over an ICN network.

BACKGROUND

Content Centric Networking (CCN) and Named Data Networking (NDN) are two related general-purpose, information-centric network (ICN) architectures. Both use a pull-based stateful forwarding model: clients send requests into the network to fetch data; network nodes keep the state of the forwarded requests; data replies follow the symmetric reverse path using the network state.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Information Centric Networking (e.g. NDN, CCN) can replace an IP network protocol's host-based addressing scheme by names of information objects in moving packets through the network. The vast majority of existing applications built on top of TCP/IP networking stacks are incompatible with ICN. Due to the differences between these network architectures, the migration of TCP/IP applications to an ICN architecture represents a non-trivial task, which requires a complete re-engineering and re-implementation of networking part and potentially other parts of the application. Analogously to TCP/IP applications, ICN applications usually require the support from the operating system in the form of an ICN networking stack, a local forwarder, and possibly a local database. It is feasible to have an ICN networking stack added to Linux/Unix operating systems, but some platforms, such as Apple iOS, are closed-source and completely guarded from any external modification. This means that it might not be possible to run native ICN applications until the device manufacturer adds an ICN stack to its operating system.

In implementations, ICN connectivity can be embedded in the existing IP infrastructure. The experience with IPv4/IPv6 transition/co-existence is not directly applicable to the problems of ICN/IP inter-networking, because IP and ICN have much less in common than IPv4 and IPv6. It is likely that an effective translation of the protocols below the transport layer (e.g. IP, ICMP) is infeasible. At the transport layer, an ability to marry the TCP protocol to ICN semantics would enable many of the most fundamental protocols of the Internet, such as HTTP 1.1, SMTP, BGP, DNS, FTP, etc. to operate successfully on an ICN substrate.

ICN protocols include Named Data Networking (NDN) and Content Centric Networking (CCN). Either of these ICN protocols can be used as the basis for embodiments of this disclosure. In these protocols, there are two basic messages: an Interest Message, which requests a piece of content via a hierarchical tokenized name, and a Data Message, which returns the requested named piece of content. Names of packet-sized objects are the only identifiers in the protocols; neither source addresses nor destination addresses are employed. Unlike IP, there is no way to push a Data Message through the network if there is no corresponding Interest Message outstanding for it.

This disclosure describes TCP/ICN proxies capable of transparently carrying TCP traffic between TCP/IP endpoints over an ICN network. The disclosure describes how to reconcile the TCP/IP push model with the ICN pull model.

Figure 1A:
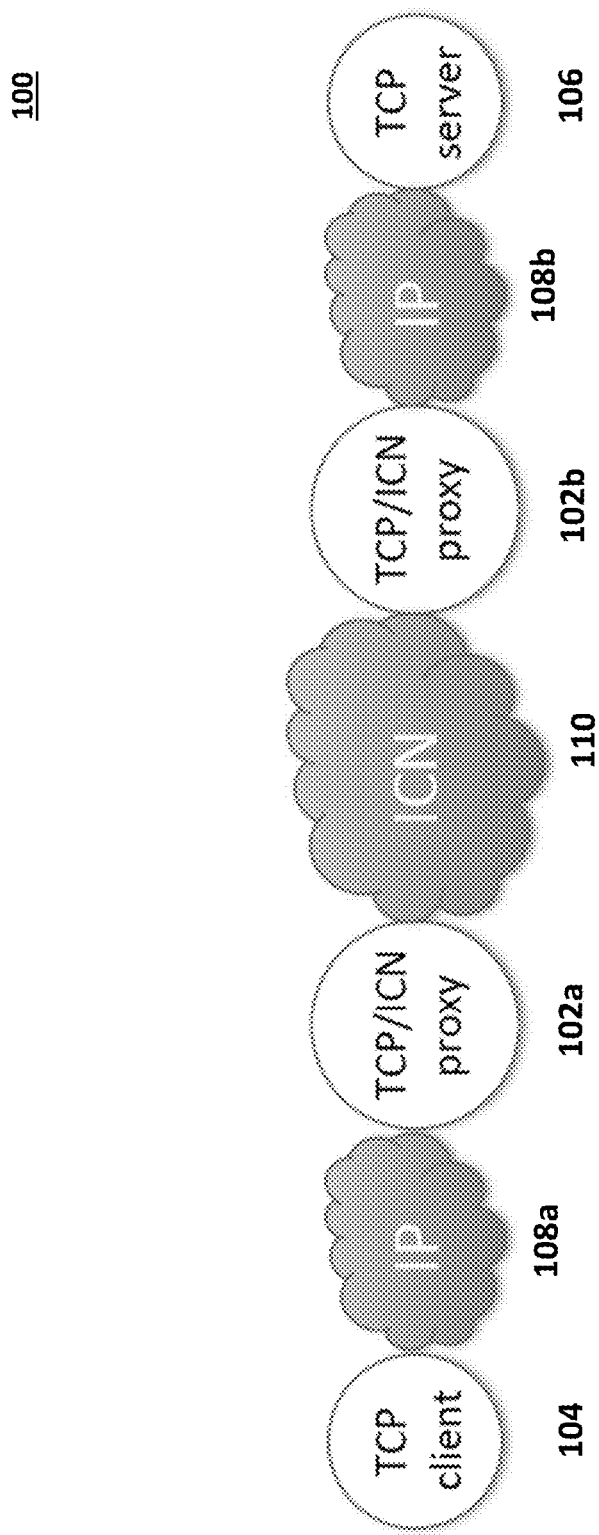
FIG. 1A is a schematic diagram of an in-network deployment of a TCP/ICN proxy in accordance with embodiments of the present disclosure.

FIG. 1A is a schematic diagram of an in-network deployment 100 of a TCP/ICN proxy in accordance with embodiments of the present disclosure. The in-network deployment 100 includes a network element 102a that can provide TCP/ICN proxy functionality, which is described below. The TCP/ICN proxy functionality can include one or both of forward proxy functionality or exit (or reverse) proxy functionality. The in-network deployment 100 also include network element 102b that hosts TCP/ICN proxy functionality, similar to network element 102a. When used in uni-directional deployment scenarios, the network element 102a can host forward proxy functionality and the network element 102b can host reverse proxy functionality.

In FIG. 1A, a TCP client 104 can generate data packets for transmittal to a TCP server 106, and can receive data packets. The TCP client 104 can communicate through an IP network 108a. In-network deployment 100 can include an ICN network 110 embedded within the network infrastructure and provides connectivity between IP network 108a and 108b to provide network connectivity between TCP client 104 and TCP server 106.

Figure 1B:
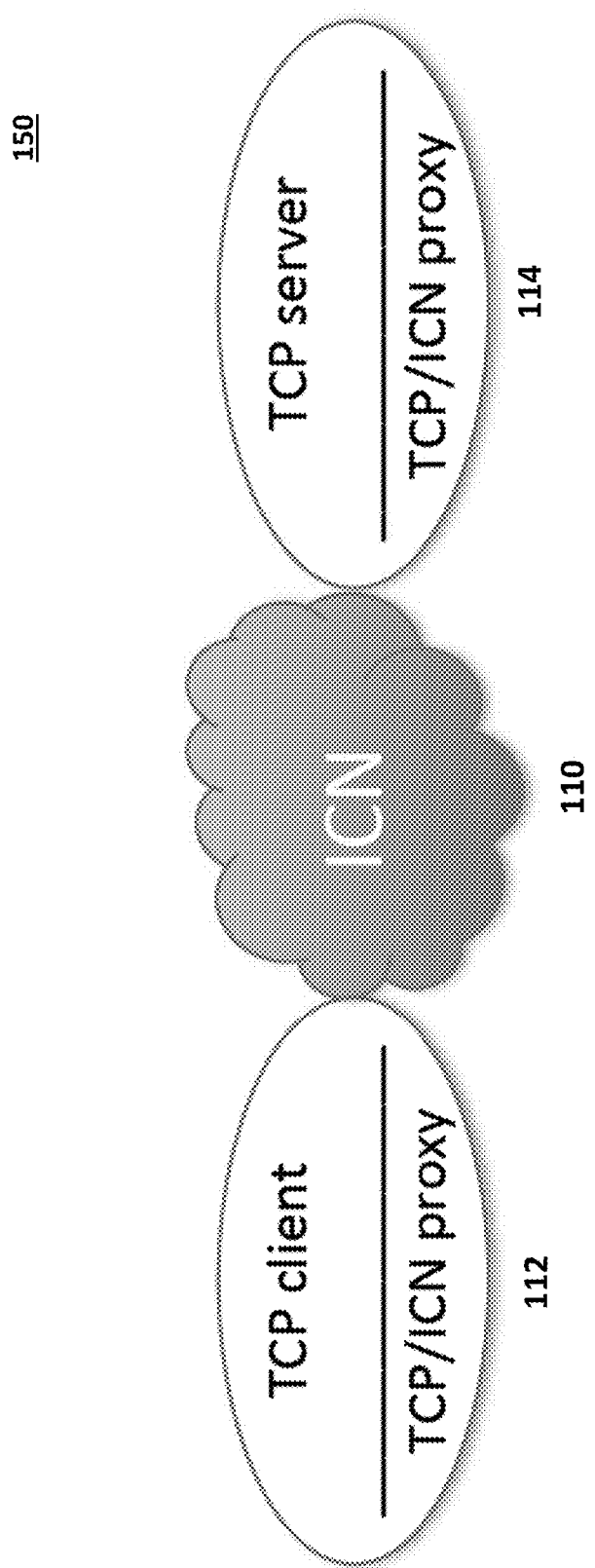
FIG. 1B is a schematic diagram of an in-host deployment that includes TCP/ICN proxy functionality of a TCP/ICN proxy in accordance with embodiments of the present disclosure.

FIG. 1B is a schematic diagram of an in-host deployment 150 that includes a network node 112 that includes TCP/ICN proxy functionality in accordance with embodiments of the present disclosure. The network node 112 and network node 114 can each include TCP/ICN proxy functionality. The network elements 112 and 114 can be directly connected to the ICN network 110.

The network elements from FIGS. 1A-1B can include TCP/ICN proxy functionality that can facilitate unmodified TCP applications to run over the ICN network 110. The TCP/ICN proxy effectively emulates TCP push semantics over ICN pull semantics.

The TCP/ICN proxy functionality can be a translation+tunneling proxy at the entry and exit points of the ICN network can facilitate carrying TCP over an ICN infrastructure. The forward and reverse proxies perform complementary functions. A forward proxy performs translation functions needed to express TCP semantics to the ICN network and encapsulates TCP/IP segments into ICN protocol Interest and Data packets for tunneling over the ICN network 110. A reverse proxy implements states in the ICN pull-based state machine and decapsulates Interest and Data packets back to TCP/IP segments.

This disclosure describes pulling TCP data and taking advantage of such ICN properties as hop-by-hop transient data caching, one-to-one flow balance, local loss recovery, and multi-path Interest forwarding, because these capabilities can potentially improve the performance of TCP. When TCP data transfer is unidirectional, the process of pulling data involves two proxies: one proxy (e.g., a forward running on network node 104) receives TCP segments from the TCP sender and converts them into ICN Data messages, and another proxy (e.g., a reverse proxy running on network node 106) transmits Interest messages retrieving these Data messages, which are translated back to TCP segments sent to the TCP receiver. When TCP data transfer is bidirectional, forward and reverse proxy functionality can be provided by each network node 104 and 106.

System Overview of ICN Data Fetching Protocol

Figure 2:
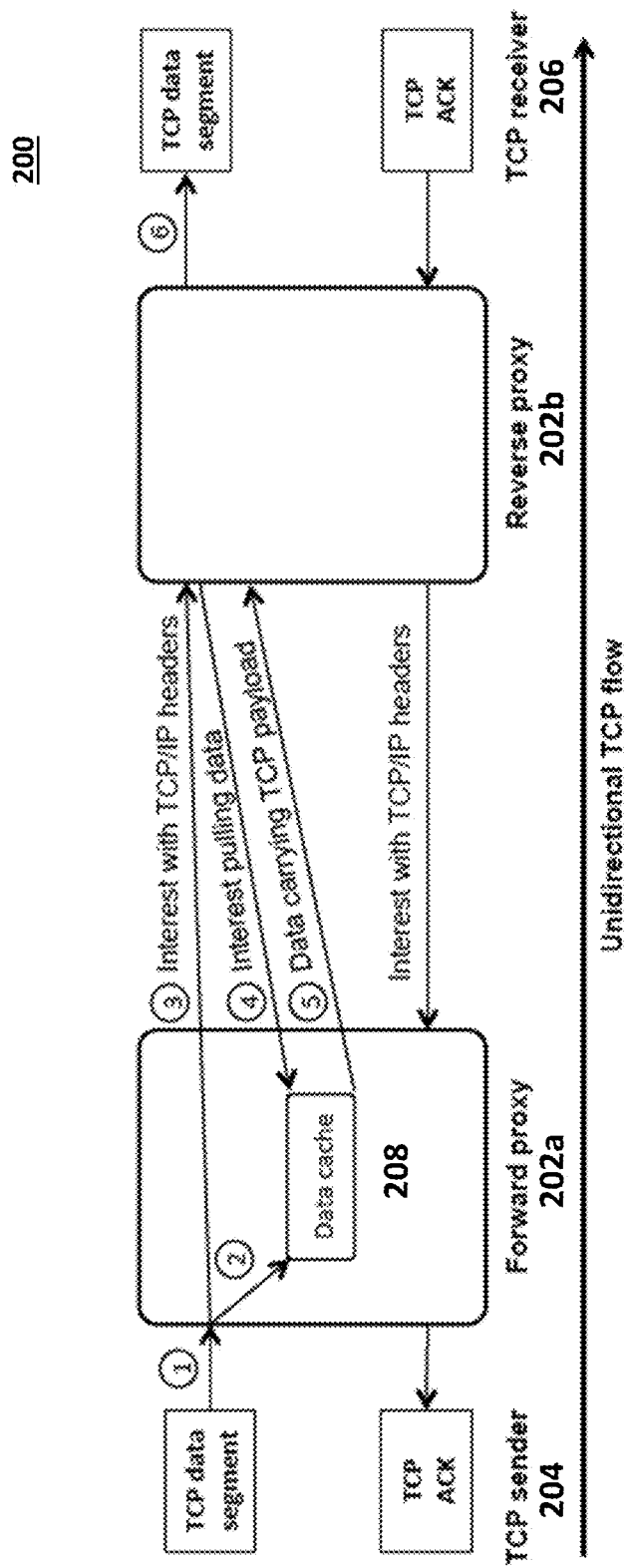
FIG. 2 is a schematic diagram of an example interproxy ICN data fetching protocol operation in accordance with embodiments of the present disclosure.

FIG. 2 is a schematic diagram 200 of an example interproxy ICN data fetching protocol operation in accordance with embodiments of the present disclosure. A "Notify-then-pull" mechanism realized via Interest-Interest-Data packet exchange is the basic way of emulating push semantics over an NDN/CCN network. An entity willing to push the data notifies another entity that data is ready to be pulled. Part of the design therefore is adherence to specific naming conventions so that names are predictable for both proxies processing the packets. The primary benefit of a TCP proxy design based solely on a "notify-then-pull" mechanism is its simplicity. Both proxies maintain only the minimum amount of state about each TCP connection, and are not required to run any complicated time- or state-synchronized inter-proxy protocol or handle any of the special cases that arise in the TCP state machines.

FIG. 2 illustrates the protocol operation for the fetching proxy. The below numbered paragraphs corresponding to the numbering in FIG. 2.

1. When a TCP segment arrives from a TCP sender 204 at a network element running a forward proxy 302a, the forward proxy 302a checks whether the segment is carrying a payload. In such case, the information in TCP/IP headers is used to construct the name of a new Interest packet. The original TCP/IP segment is placed in the payload of a corresponding new Data packet (i.e. encapsulated in an ICN Data packet).

2. The following naming convention for Data packets carrying TCP segments with payload can be used herein:
/[forward-proxy-prefix]/[TCP-4-tuple]/[TCP-sequence-number]/[Wraparound-number]

The term "forward-proxy-prefix" is the routable name prefix of the proxy 302a that has received TCP segment. The "TCP-4-tuple" name component(s) includes source IP, source port, destination IP and destination port, which are necessary for TCP connection identification by the reverse proxy 302b. The "TCP-sequence-number" name component exactly matches the sequence number of the corresponding TCP segment. Since the binding of data to names in NDN and CCN is not mutable, a "Wraparound-number" field is used to prevent name collisions when the TCP sequence number wraps around. In embodiments, a sequential versioning scheme can be used. In a sequential versioning scheme, as opposed to using timestamps for versioning, both proxies detect wraparound events independently and increment the wrap-around number each time it occurs.

3. The following naming convention for Interest packets carrying only TCP/IP headers with no payload can be used herein:
/[rev-proxy-prefix]/[TCP-IP-headers]/[nonce]

The term "rev-proxy-prefix" is the routable name prefix of the reverse proxy 302b responsible for decapsulating Interest and Data packets into TCP/IP segments. The TCP-IP-headers name component carries all TCP/IP headers including all options. Nonce is a random number that ensures the uniqueness of the Interest message. This is necessary for preventing ICN forwarders from suppressing duplicate ACK transmissions sent by TCP receivers. Instead of (or in addition to) a nonce, the signature of the Interest can be used for uniqueness. The use of the Interest signature can provide additional protection of the inter-proxy protocol against malicious senders generating 'fake' Interests in order to disrupt the operation of the protocol.

4. If an Interest arriving at a network element 302b running the reverse proxy carries TCP/IP headers indicating there is accompanying TCP data to be pulled, the reverse proxy transmits a "reflexive" Interest packet with a name that is guaranteed to match the Data packet stored in the cache 208 of the forward proxy. The reverse proxy on network node 202b does not enforce reliability, therefore TCP endpoints continue to be responsible for recovering data loss, just as they do when running over IP.

5. When a forward proxy receives the reflexive Interest packet, it attempts to find matching Data packet in its Data cache.

6. When the reverse proxy receives a Data packet, it transmits the decapsulated TCP segment(s) over IP to the TCP receiver 206.

Figure 3A:
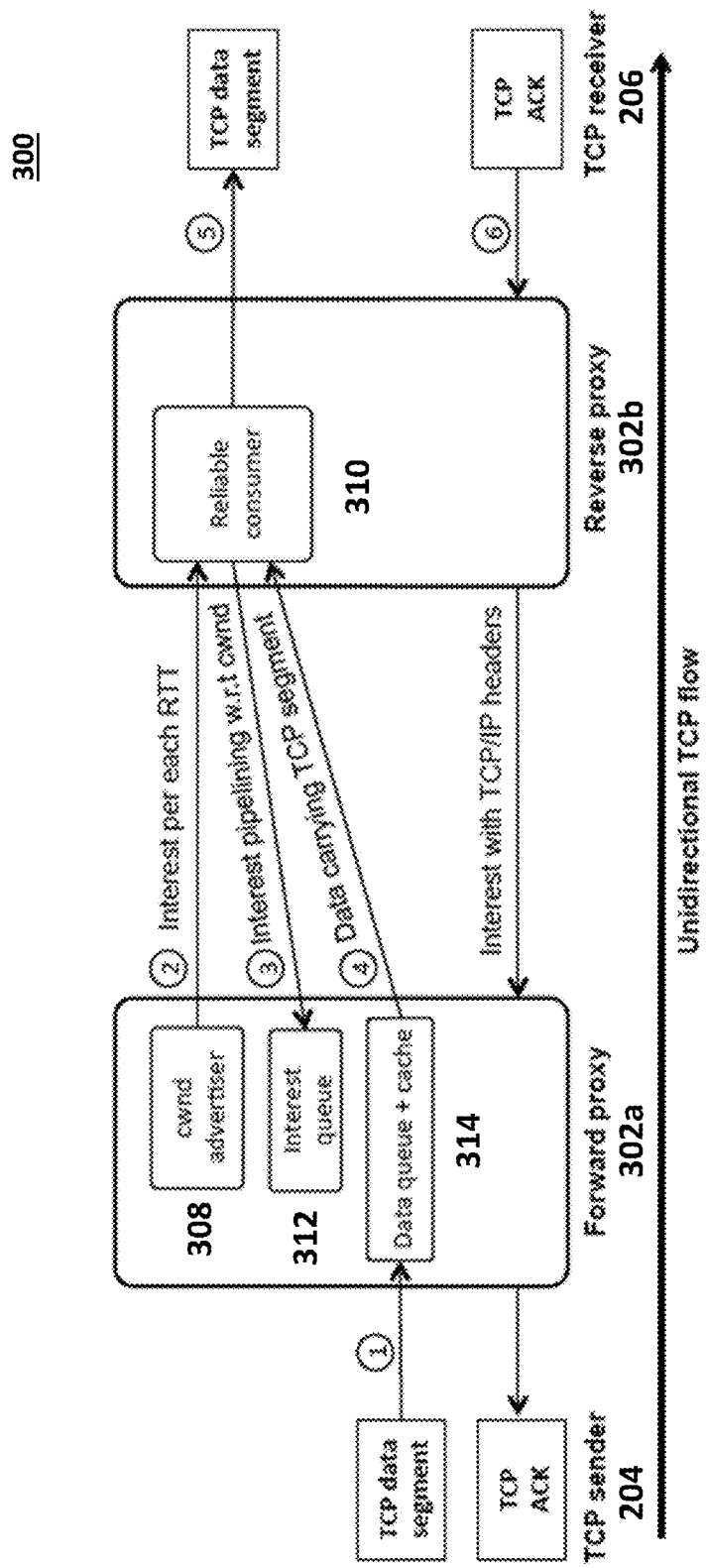
FIG. 3A is a schematic diagram of another example interproxy ICN data fetching protocol operation in accordance with embodiments of the present disclosure.

FIG. 3A is a schematic diagram 300 of another example interproxy ICN data fetching protocol operation in accordance with embodiments of the present disclosure. In embodiments, the reverse proxy can maintain a window of outstanding Interest packets in such a manner that whenever the forward proxy receives a TCP data segment there is an outstanding Interest at the proxy which could be matched with ICN Data packet for the TCP segment in response.

Compared to basic fetching, prefetching reduces latency and decreases the number of packet transmissions. This scheme can be referred to as 'reliable' in the sense that the reverse proxy ensures successful delivery of all requested Data packets from the forward proxy (e.g., via an interface to a consumer, such as reliable consumer 310). The consumer at the reverse proxy performs transmission of new Interest packets and retransmission of timed out Interests. Reliable prefetching can also conceal packet losses in the ICN network infrastructure from TCP endpoints, and thereby improve TCP throughput by avoiding TCP retransmissions.

In the basic fetching protocol, data names are mapped to TCP sequence numbers. In the reliable prefetching protocol, data names cannot be mapped straightforwardly to TCP sequence numbers because the reverse proxy cannot predict the progression of TCP sequence numbers of available Data segments at the moment when it has to send Interest packets. Instead, Data names contain an independent (of the TCP sequence space) sequence name component whose value monotonically increases for each new incoming TCP segment. Such a predictable naming pattern allows reverse and forward proxies to have a synchronized understanding of what packets had been produced, fetched, lost and retransmitted.

The below numbered paragraphs corresponding to the sequence numbering in FIG. 3A.

1. If an incoming TCP segment contains a payload, the whole TCP segment is encapsulated by the forward proxy in a Data packet carrying a name with monotonically increasing sequence number. The Data packet is placed in the data queue 314 if there is no matching Interest in the Interest queue 312. An example name is provided below:

/[forward-proxy-prefix]/[TCP-4-tuple]/[sequence-number]

2. Efficient operation of the reliable prefetching protocol largely depends on accurate estimation of the consumer's Interest window size. Too many outstanding Interests, possibly retransmitted multiple times because of being sent too early, unnecessarily consume bandwidth and processing capacity. Too few outstanding Interests depresses the TCP transmission rate by capping the outstanding Interest count below the TCP congestion window size. To give a hint to the consumer at the reverse proxy, the forward proxy can periodically advertise to the reliable consumer 310 the estimated congestion window size of the TCP sender (e.g., through a congestion window advertiser 308).

In the absence of a way to dynamically adjust the outstanding Interest count, as the TCP sender's congestion window size increases so will the TCP segment data queue at the forward proxy. The size of TCP data queue 314 can therefore act as surrogate to estimate the TCP congestion window size. By the forward proxy advertising this periodically (e.g. once per RTT), the reverse proxy can track the congestion window with a one-RFI delay and adjust the consumer's outstanding Interest window.

3. The consumer 310 at the reverse proxy performs transmission of new Interest packets and retransmission of timed out Interests. This scheme allows the ICN network to conceal packet losses from TCP endpoints by using built-in transient caching of Data packets in the NDN/CCN infrastructure.

4. Incoming Interest packets from the reverse proxy are placed in the Interest queue 312 in the forward proxy if there is no matching Data packet in the TCP data queue. Otherwise, the Data packet is returned immediately to the reverse proxy and may be cached at intermediate forwarders, allowing faster recovery from loss.

5. The TCP data segment is extracted from the Data packet and transmitted to the TCP receiver over IP.

6. TCP segments that do not carry any payload (e.g. ACK, SYN, FIN packets, etc.) are transformed into Interest packets and do not have to be fetched separately. The namespace design used by the reliable prefetching proxy for Interest packets is identical to the one in the basic fetching proxy.

Figure 3B:
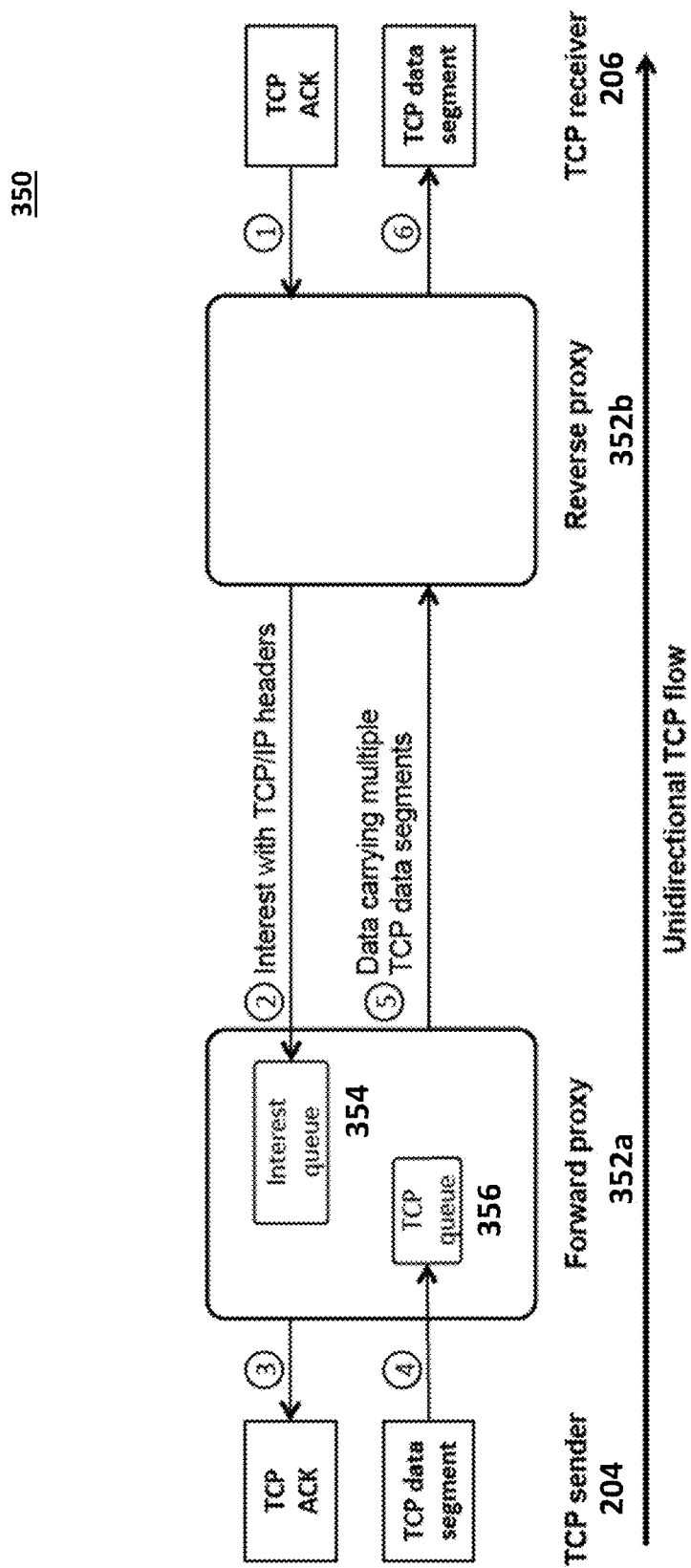
FIG. 3B is a schematic diagram of another example interproxy ICN data fetching protocol operation in accordance with embodiments of the present disclosure.

FIG. 3B is a schematic diagram 350 of another example interproxy ICN data fetching protocol operation in accordance with embodiments of the present disclosure. The ICN Data fetching protocol control loop is tightly synchronized with the outer TCP control loop. This fact greatly simplifies the design of the proxy since it requires only one Interest queue and one TCP queue and does not require any independent flow- or congestion-control ICN mechanism in the proxy. The Interest queue size grows linearly with congestion window size at the TCP sender, because the number of Interests matches the number of transmitted acknowledgements. This allows each connection to take all available bandwidth while obeying TCP fairness properties.

A way to eliminate the complexity of Interest window management is to clock the prefetching processes exclusively by the receipt of acknowledgements from the TCP receiver. In other words, it is possible to transmit an Interest only in the case when there is an incoming ACK packet from the TCP endpoint. The following paragraph numbering corresponds to the sequence numbering in FIG. 3B:

1. A TCP segment not carrying any payload (e.g. empty ACK, SYN-ACK, etc.) is translated to an Interest by the reverse proxy 352*a*, whose name carries the routable name prefix of the reverse proxy 352*b* (also referred to as a destination proxy or exit proxy), and the necessary TCP and IP headers (e.g., as shown in FIGS. 5-8).

2. Incoming Interest messages to the forward proxy 352*a* are stored in the Interest queue 354 until their near-expiration. For example, an Interest packet can include an Interest Lifetime field with a value indicating how long the Interest packet is to be considered outstanding. All Interest messages approaching their near-expiration time are removed from the queue 354. The forward proxy can discard an Interest packet that is expired or nears expiration.

Interest messages are queued to ensure that Interest messages are available for creating a Data message to encapsulate a data packet arriving at the forward proxy.

3. If the incoming Interest message carries actual TCP/IP headers (e.g. empty ACK field), the proxy 352*a* can (immediately) generate a TCP segment from it.

4. The TCP sender 204 can receive an ACK (at step 3) and transmit new data segment(s), which arrive at the proxy 352*a*. The proxy 352*a* puts TCP data segment(s) in a TCP queue 356 and determines how many TCP segments must be taken from the TCP queue 356 to be packaged together in a single Data message.

5. An ICN Data message is created by the forward proxy 354 with a name that matches the name of the oldest non-expired Interest from the Interest queue 354 (i.e. top of the queue 354, head-of-line).

6. The reverse proxy 356 receives a Data message and passes multiple TCP data segments towards the TCP receiver.

Figure 4:
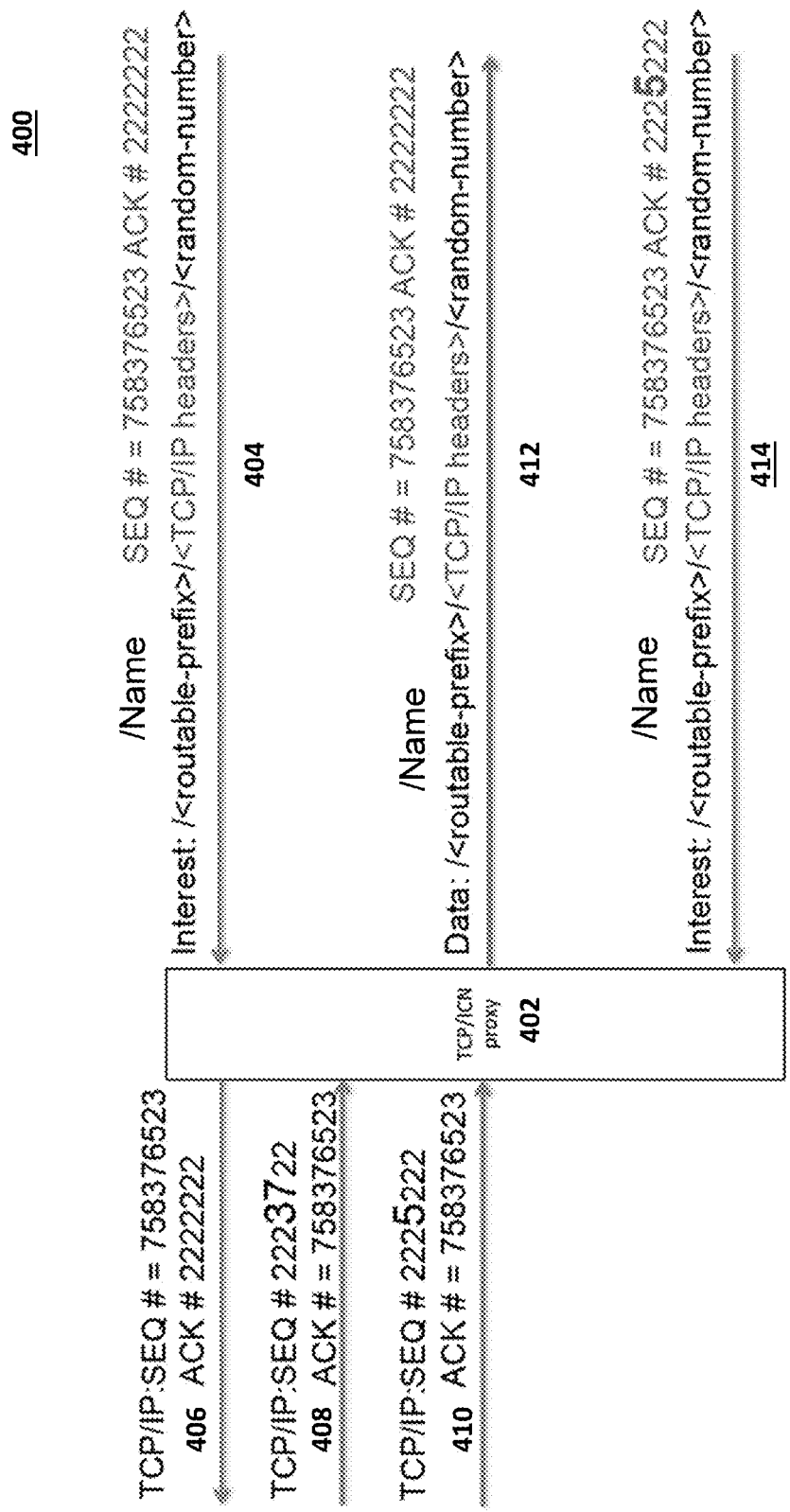
FIG. 4 is a schematic diagram of unidirectional data transfer using a TCP/ICN proxy in accordance with embodiments of the present disclosure.

FIG. 4 is a schematic diagram 400 of unidirectional data transfer using a TCP/ICN proxy 402 in accordance with embodiments of the present disclosure. The naming model uses the original TCP sequence numbers similarly to the basic fetching protocol. To allow intended duplicate ACKs to reach TCP endpoints and avoid aggregation in NDN/CCN forwarders, and to prevent any possible re-use of previously used names with modified content (i.e. mutable data) every Interest name has a random value (nonce) appended to make it unique.

The names of Data packets might not reflect their content. At best, the relationship between the content (i.e. TCP data segments) and the names can be characterized as time-shifted, because names contain the sequence numbers used by TCP one round-trip before. FIG. 4 is a snapshot of the ICN message sequence numbering scheme at the moment when a forward proxy 402 receives an acknowledgement Interest for previous TCP segments and uses it to transmit a Data message carrying two new TCP data segments.

At the outset, in FIG. 4, a TCP/ICN proxy 402 receives an acknowledgement Interest message 404. The Interest message 404 includes a name that has a sequence number and a TCP ACK. The Interest message 404 also includes the TCP/IP headers. The TCP/ICN proxy 402 can send an ACK 406 to the TCP sender (not shown). The TCP sender can send a TCP packet 408 and TCP packet 410 to the network node running the TCP/ICN proxy 402. The TCP/ICN proxy 402 can then package the received packets together into a single ICN data message 412, and send the Data message 412 through the ICN network in response to an outstanding Interest. The ICN data message 412 includes the TCP/IP headers from the received data packets as well as the payloads for the received data packets. The TCP/ICN proxy 402 can receive an Interest message 414 that acknowledges the receipt of the ICN data message 412, where the ACK identifies the highest sequence number from the data segments encapsulated in the ICN Data message.

The above described a single direction of data flow for a TCP connection, We now describe full duplex operation where there are TCP data segments flowing in both directions of the TCP connection. TCP piggybacks acknowledgements in its data segments, which would result in no Interests sent by TCP/ICN proxies without a special handling of full duplex transfers. In order to recognize a bidirectional data transfer, each TCP/ICN proxy keeps track of the highest acknowledgement number received from the TCP endpoint up to the moment. If an incoming TCP data segment carries a payload and has an ACK number higher than previously recorded one, the TCP/ICN proxy must decide whether an Interest should be sent towards the reverse proxy to fetch the TCP data segments going in the opposite direction. The decision could be "send Interest for each TCP data segment," but that is likely to result in too many Interests, thereby reducing available bandwidth. Other approaches include:

a) Fixed probability (e.g. send an Interest message for every other TCP data segment—50% probability);

b) Decide to send as a function of the magnitude by which the acknowledgement number increases (e.g. send an Interest message after the acknowledgement number advances by a specified number of bytes).

The efficiency of TCP data transfer over the ICN network depends sensitively on the detailed design on the unreliable inter-proxy protocol. The pulling process must be exclusively clocked by the acknowledgements from the TCP receiver. An Interest message is sent only in the case when there is an incoming TCP ACK segment. The proxy should not perform any Interest retransmissions but instead should let TCP (or in-network Interest retransmission if available) recover from losses.

Several challenges immediately present themselves given these requirements. First, TCP usually acknowledges only every other TCP segment. Second, a TCP sender is constantly probing for more available bandwidth by increasing its congestion window size. This means that in normal circumstances the number of TCP acknowledgements is frequently smaller than the number of TCP data segments. Therefore, we provide two ways to overcome the deficit of Interests in order to accommodate incoming TCP data. These are described below:

1) Artificially inflate the number of transmitted Interests. For example, the proxy could duplicate each empty TCP ACK as multiple Interests, and the other proxy would de-duplicate Interests to avoid invalid duplicate ACK creation.

2) Package multiple TCP data segments in a single Data message. This would require named data/content centric network MTU to be multiple times larger than the TCP MSS.

The packaging of multiple TCP data segments is preferred, because the other approach is non-deterministic and adds more complexity to the system. Up to five TCP data segments could be packaged in a single Data message if the TCP/ICN proxy enforces standard 1500 byte MSS to TCP endpoints and operates with 8 KB Data messages encapsulated in Ethernet jumbo frames. Simulation models demonstrate that most of the time, each Data message carries just two TCP data segments, because TCP acknowledges every 2nd packet. In order to reduce ICN related packet overhead (and thereby increase goodput) it is beneficial to put the maximum possible number of TCP segments in each ICN Data message.

Session Set-up and Tear-down

Figure 5:
FIG. 5 is a schematic diagram of an ICN packet sequence during TCP connection setup in accordance with embodiments of the present disclosure.

A TCP connection is established before any data transfer occurs. Since connection setup does not involve passing large amounts of data between TCP endpoints, the TCP protocol three-way handshake (SYN->SYN-ACK->ACK) can be translated into one or more ICN packet exchanges, which are described below:

a) FIG. 5 is a schematic diagram 500 of an ICN packet sequence during TCP connection setup in accordance with embodiments of the present disclosure. In a first embodiment, a three-way Interest exchange can occur between forward and reverse TCP/ICN proxies; the packet can include TCP/IP headers carried in the names of Interest messages. This first embodiment is shown in FIG. 5. In FIG. 5, a forward proxy can receive a packet from a TCP sender that does not include a payload (e.g., the received packet includes a SYN, SYN-ACK, ACK, etc.). The TCP/ICN proxy identifies that the received Interest message does not include a data payload, but rather, includes a SYN . The TCP/ICN proxy can encapsulate the received message as an Interest message 502 that includes the SYN , and send the Interest message 502 to the reverse proxy. The TCP/ICN proxy can determine a name for the Interest message and can augment the ICN name with TCP/IP headers from the received packet. The TCP/ICN proxy can also map the TCP/IP address to a name and routing prefix that can be used to route the ICN Interest message that carries the TCP/IP headers through the ICN network and to a reverse TCP/ICN proxy. The reverse TCP/ICN proxy can decapsulate the ICN Interest message and transmit the TCP message to the TCP receiver across the TCP/IP network using the information in the TCP/IP headers carried by the ICN Interest message.

An Interest message 504 can be received by the forward proxy that includes a SYN-ACK carried by the Interest message name, sent by the reverse proxy. The forward TCP/ICN proxy can interpret the Interest message as a SYN-ACK from the TCP receiver that the connection set up request was received.

Figure 6:
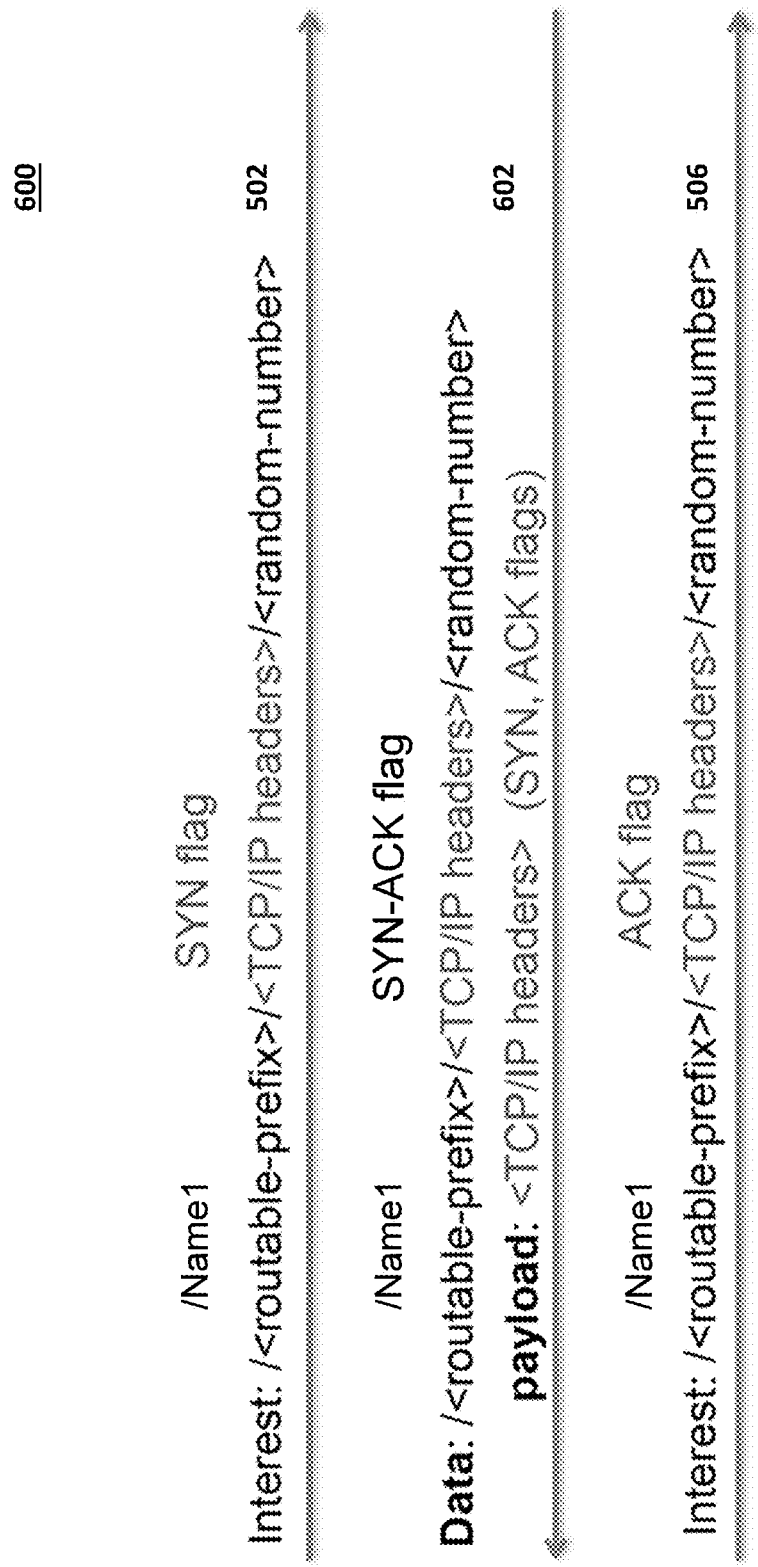
FIG. 6 is a schematic diagram of an ICN packet sequence during TCP connection setup in accordance with embodiments of the present disclosure.
Figure 7:
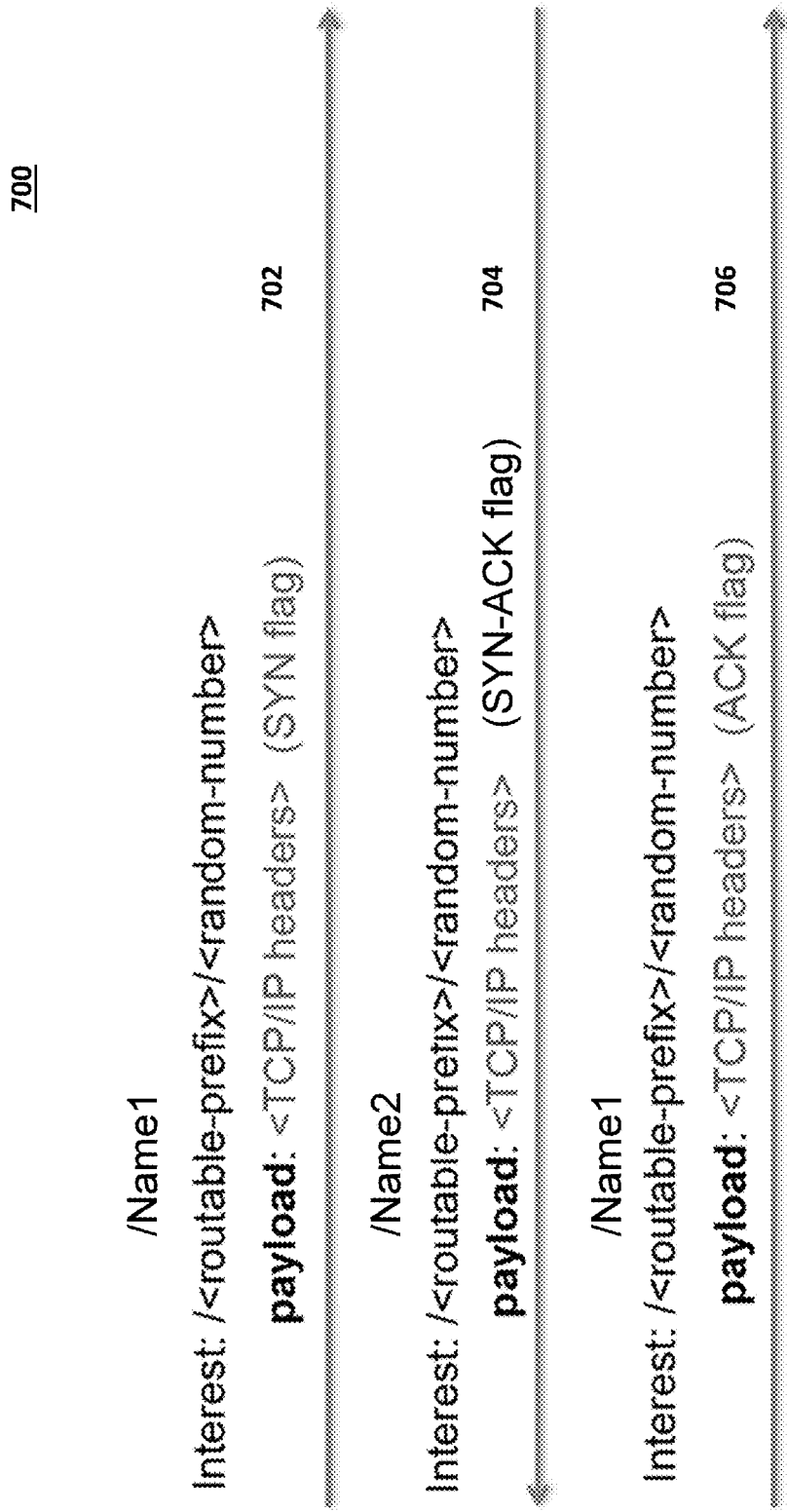
FIG. 7 is a schematic diagram of an ICN packet sequence during TCP connection setup in accordance with embodiments of the present disclosure.

The TCP sender can send another ACK message to the forward proxy, which can encapsulate the ACK message as an ICN Interest message (as opposed to a data message, because the ACK message has no payload), and transmit the ICN Interest message to the reverse proxy via the ICN network, the ICN Interest message 506 including the ACK carried by the name of the ICN Interest message 506.

b) FIG. 6 is a schematic diagram 600 of an ICN packet sequence during TCP connection setup in accordance with embodiments of the present disclosure. In the embodiment described in FIG. 6, an Interest-Data-Interest exchange can occur between forward and reverse TCP/ICN proxies, with TCP/IP header carried in the Interest names and Data payload. The hand-shake of FIG. 6 is similar to that of FIG. 5. Instead of using an Interest message to communicate the SYN-ACK, however, the reverse proxy can send an ICN Data message 602 that includes within its payload the SYN-ACK flags and includes the SYN in the name. The ICN Data message 602 has the same name as the ICN Interest message 502. The ICN Data message 602 includes the TCP/IP headers carrying a SYN-ACK from the TCP receiver's TCP message. The forward proxy would decapsulate the Data message 602 and send the SYN-ACK to the TCP sender as a SYN-ACK message over the TCP/IP network.

c) FIG. 7 is a schematic diagram 700 of an ICN packet sequence during TCP connection setup in accordance with embodiments of the present disclosure. In FIG. 7, a three-way Interest exchange between forward and reverse TCP/ICN proxies, with TCP/IP headers carried in the payload of Interest messages (only in content centric networking (CCN)). An Interest message 702 can be sent by the forward proxy to a reverse proxy through the ICN network. The Interest message 702 can include a SYN flag in the payload to request session set up between a TCP sender and a TCP receiver.

The reverse proxy can determine that the Interest message includes a SYN flag in the payload, decapsulate the Interest message 702, and route the SYN to the TCP receiver across a TCP/IP network. The reverse proxy can return an Interest message 704 that includes a SYN-ACK and flag(s) in the payload. And the forward proxy can send an Interest message 706 with an ACK in its payload.

d) In a fourth embodiment, an Interest-Data-Interest exchange can occur, with TCP/IP headers carried in the payload of Interest and Data messages (only in CCN).

Figure 8:
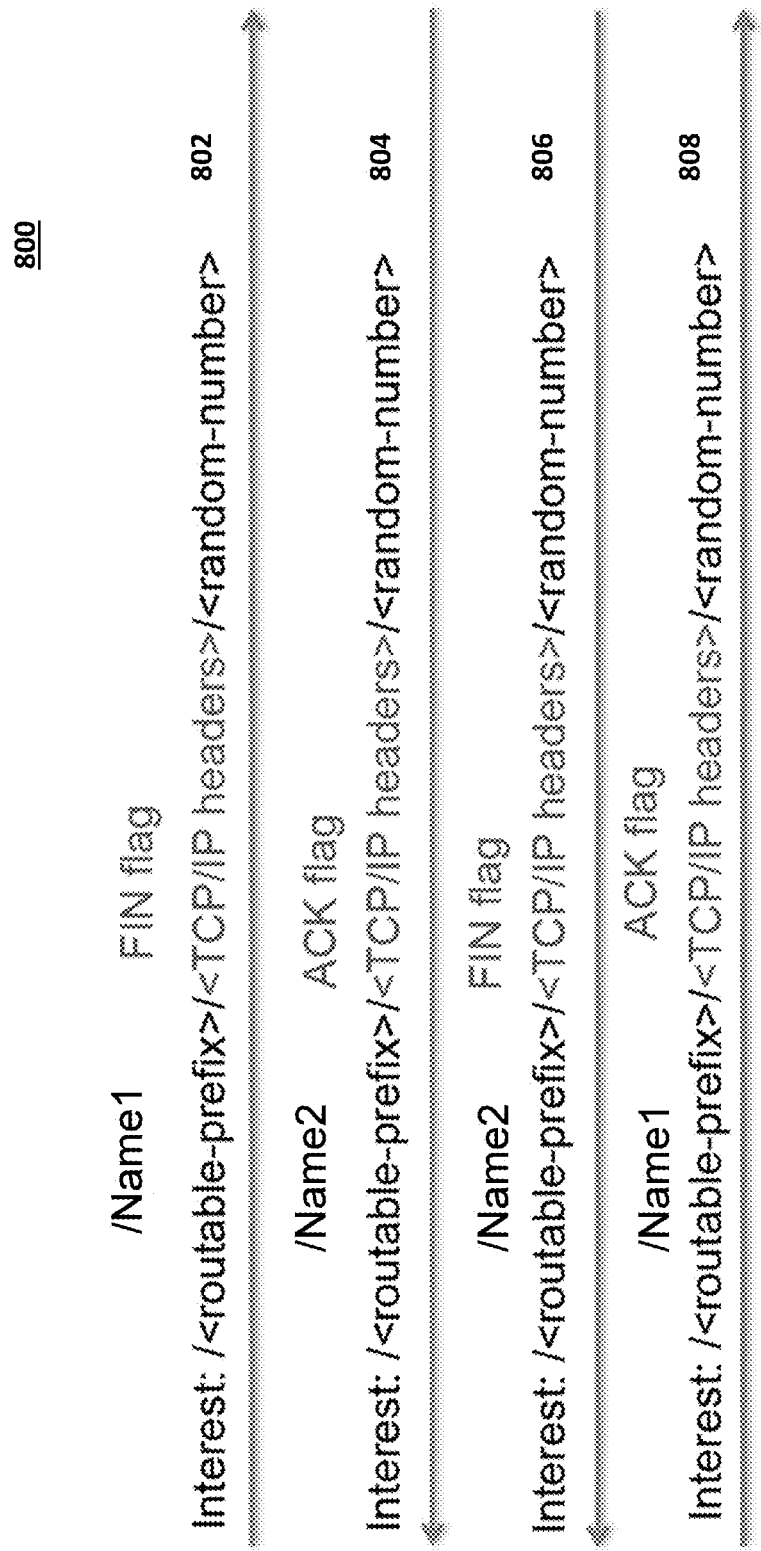
FIG. 8 is a schematic diagram of an ICN packet sequence during TCP connection teardown in accordance with embodiments of the present disclosure.

FIG. 8 is a schematic diagram 800 of an ICN packet sequence during TCP connection teardown in accordance with embodiments of the present disclosure. The TCP connection can be terminated either by the client or the server by sending an empty TCP packet with FIN (finish) or RST (reset) flag. The mechanism used to translate connection teardown message exchange to ICN semantics is similar to the translation of TCP connection setup. FIG. 8 illustrates the exchange of packets using the Interest messages carrying TCP/IP header in the name. A translation mechanism as described above for a)-d) above can be used as for connection teardown, as well.

In FIG. 8, a forward proxy can encapsulate a received TCP teardown request message (e.g., that includes a FIN flag) as an ICN Interest message 802 that includes the FIN flag in the name of the ICN message. The forward proxy can transmit a FIN flag in the name of the Interest message 802 to teardown a connection. The reverse proxy can encapsulate an acknowledgement message received from a TCP receiver as an Interest message 804 that carries the ACK in the name of the Interest message 804. The reverse proxy can transmit an ACK flag in the name of an Interest message 804 to the forward proxy acknowledging the teardown request.

Likewise, the reverse proxy could send an Interest message 806 to the forward proxy that carries a FIN flag in the name of the Interest message 806; and the forward proxy can send an ACK using an Interest message 808 that carries the ACK in the name of the Interest message 808.

Example Implementations:

Implementation scenario 1: Multiple TCP segments carrying payload can be packaged together in a single ICN Data message. The number of TCP segments that are packaged together might be fixed (e.g. 2 TCP segments per Data) or depend on the current size of TCP queue and Interest queue, or depend on other dynamic parameters.

Implementation scenario 2: If a TCP sender goes idle for more than a short time, all Interest messages in the queue might expire. When the TCP sender becomes active again and attempts to push more data, the proxy would therefore not have any Interests to use for new Data messages. This is resolved with a special "wake up" Interest message towards the reverse proxy. The "wake up" Interest message name must contain a routable name prefix of the reverse proxy and an additional name component(s) carrying enough information to identify TCP 4-tuple, and potentially an auxiliary information about the current TCP queue size. When the proxy receives a "wake up" Interest message, it might consider auxiliary information (e.g. the decaying TCP congestion window size prior to going idle) to determine how many Interest messages should be sent in response (minimum one) to restart the normal operation of inter-proxy protocols or pulling ICN data packets containing TCP segment.

Implementation scenario 3: The TCP/ICN proxy needs to accommodate TCP connections that operate in a simultaneous bidirectional data transfer mode, because TCP piggybacks acknowledgements in its data segments, resulting in no empty ACKs, and which would result in no Interest messages sent without special handling of such a case (TCP data segments are packaged as Data messages). To recognize bidirectional data transfer, the TCP/ICN proxy keeps track of the highest acknowledgement number (as shown in FIG. 4). If an incoming TCP segment carries a payload and has a higher ACK number than previously recorded, the TCP/ICN proxy must make a decision whether an Interest message should be sent towards the reverse proxy to fetch TCP data going in its direction. The decision could be as simple as "send Interest" for each TCP data segment, but that is likely to result in too many Interests taking away bandwidth. Other approaches include:

1. Fixed probability (e.g. send an Interest message for every other TCP data segment—50% prob.); or 2. Function of the increase of acknowledgement number (e.g. send an Interest message after acknowledgement number advances the specified number of bytes).

Note: in bidirectional transfer mode, the Interest messages do not have to carry all TCP/IP headers and might carry just enough information to identify TCP 4-tuple.

Implementation scenario 4: The TCP/ICN proxy needs to know what routable ICN name should be used as a prefix of Interest messages to reach proper reverse proxy. In some deployments (e.g. small enterprise) there may be only a single reverse proxy, whose routable name could be specified in a manual configuration file. In larger scale deployments, there could be multiple potential reverse proxy destinations, so it would be advantageous to dynamically resolve destination IP address to the ICN prefix by, e.g., a reverse DNS lookup. Other ways of resolving the destination IP address can include sending an IP discovery packet to the IP address using a discovery protocol, which can return a host name. In some embodiments, a request can be sent using a management protocol to a network management service that includes the IP address and a request for resolution, and information can be received from the network management service that can be used to construct a name.

Figure 9:
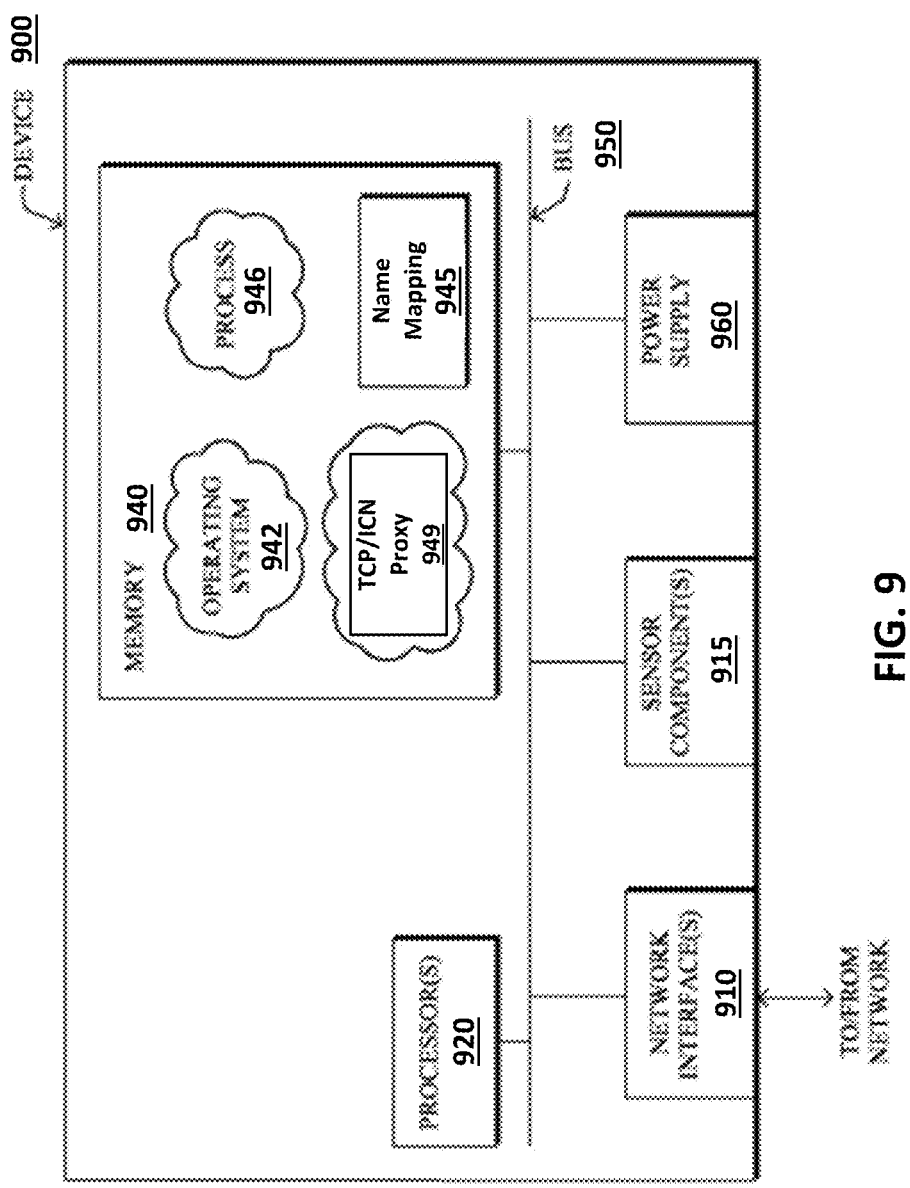
FIG. 9 is a schematic block diagram of an example network element in accordance with embodiments of the present disclosure.

FIG. 9 is a schematic block diagram of an example node/device 900 that may be used with one or more embodiments described herein, e.g., as any of the nodes shown in FIG. 1 above. The device may comprise one or more network interfaces 910 (e.g., wired, wireless, PLC, etc.), at least one processor 920, and a memory 940 interconnected by a system bus 950, as well as a power supply 960 (e.g., battery, plug-in, etc.), sensor components 915, etc.

The network interface(s) 910 contain the mechanical, electrical, and signaling circuitry for communicating data over links 950 coupled to a TCP/IP network. The network interface(s) 910 may be configured to transmit and/or receive data using a variety of different communication protocols. Note, further, that the nodes may have two different types of network connections, e.g., wireless and wired/physical connections, and that the view herein is merely for illustration. Also, while the network interface 910 is shown separately from power supply 960, for PLC the network interface 910 may communicate through the power supply 960, or may be an integral component of the power supply 960. In some specific configurations the PLC signal may be coupled to the power line feeding into the power supply.

The memory 940 comprises a plurality of storage locations that are addressable by the processor 920 and the network interfaces 910 for storing software programs and data structures associated with the embodiments described herein such as TCP/ICN proxy functionality 949 (e.g., forward proxy functionality, reverse proxy functionality, or both) and TCP-ICN name mapping for routing purposes. Note that certain devices may have limited memory or no memory (e.g., no memory for storage other than for programs/processes operating on the device and associated caches). The processor 920 may comprise hardware elements or hardware logic adapted to execute the software programs and manipulate data structures An operating system 942, portions of which are typically resident in memory 940 and executed by the processor, functionally organizes the device by, inter alia, invoking operations in support of software processes and/or services executing on the device. These software processes and/or services may comprise Bloom filter routing process/services 946.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the features, as outlined herein. Additionally, each of these devices may include a processor that can execute software or an algorithm to perform the features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations.

It is also important to note that the various steps described herein illustrate only some of the possible scenarios that may be executed by, or within, the nodes with capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. § 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method performed in a network node, the method comprising:
   receiving a first packet at the network node, the first packet compliant with a Transmission Control Protocol (TCP) protocol;
   encapsulating one or more TCP headers from the first packet into a payload field of a second packet, the second packet compliant with an Information Centric Networking (ICN) protocol;
   transmitting the second packet to a destination through an ICN network;
   determining that the first packet does not have a data payload;
   identifying a control flag from the first packet; and
   determining to encapsulate the control flag from the first packet into an ICN Interest message based on the lack of payload in the first packet; and
   wherein transmitting the second packet comprises transmitting the ICN Interest message.

2. The method of claim 1, further comprising:
   identifying a name for the ICN Interest message for routing the ICN Interest message;
   augmenting the name of the ICN Interest message with the control flag from the first packet.

3. The method of claim 1, further comprising encapsulating the control flag in the payload field of the second packet.

4. The method of claim 1, wherein the control flag comprises one or more of a SYN, ACK, SYN-ACK, NACK, or FIN flag.

5. The method of claim 1, further comprising:
   determining that the first packet includes a data payload; and
   determining to encapsulate the data from the first packet into an ICN Data message based on the presence of data payload in the first packet; and
   wherein transmitting the second packet comprises transmitting the ICN Data message.

6. The method of claim 1, wherein encapsulating one or more TCP headers from the first packet into a payload field of a second packet comprises:
   determining that a number of TCP data segments in a TCP queue has reached a threshold number of segments; and
   encapsulating a predetermined number of TCP data segments in a payload field the second packet, wherein the second packet is an ICN Data message.

7. The method of claim 1, further comprising:
   receiving one or more ICN Interest messages;
   adding the one or more ICN Interest messages to an Interest queue;
   identifying an oldest ICN Interest message in the Interest queue that has not expired; and
   using a name of the oldest ICN Interest message in the Interest queue as a name for the second packet.

8. The method of claim 7, further comprising:
   determining that all of the ICN Interest messages in the Interest queue have expired;
   transmitting a wake up message to a network node hosting a reverse proxy through the ICN network,
   receiving one or more ICN Interest messages based on the wake up message; and
   storing the one or more ICN Interest messages in the Interest queue.

9. The method of claim 1, further comprising:
receiving an ICN data message from a network node hosting a forward proxy through the ICN network;
decapsulating the ICN data message to extract TCP/IP header information and TCP data payload from a payload of the ICN data message;
determining a destination for the TCP data payload; and
transmitting the TCP data payload as a TCP packet to the destination.

10. The method of claim 1, further comprising:
determining an ICN name for routing the second packet based on a domain name service (DNS) lookup using TCP/IP information in the first packet; and
using the ICN name as a routing prefix for the second packet.

11. The method of claim 1, further comprising:
recording ACK numbers for traffic routed through the network node;
receiving a data packet comprising a data payload and an ACK number that is higher than a highest recorded ACK number;
sending an ICN Interest message to a reverse proxy hosted by a network node through the ICN network requesting an Interest message from the reverse proxy;
receiving an ICN Interest message from the reverse proxy; and
using the ICN Interest message to encapsulate the data packet as an ICN data packet for routing through the ICN network.

12. A computer-readable non-transitory medium comprising one or more instructions, the instructions when executed on a processor are operable to:
receive a first packet at the network node, the first packet compliant with a Transmission Control Protocol (TCP) protocol;
encapsulate one or more TCP headers from the first packet into a payload field of a second packet, the second packet compliant with an Information Centric Networking (ICN) protocol;
transmit the second packet to a destination through an ICN network;
determine that the first packet does not have a data payload;
identify a control flag from the first packet; and
determine to encapsulate the control flag from the first packet into an ICN Interest message based on the lack of payload in the first packet; and
wherein transmitting the second packet comprises transmitting the ICN Interest message.

13. The computer-readable non-transitory medium of claim 12, wherein the instructions when executed are further operable to:
identify a name for the ICN Interest message for routing the ICN Interest message;
augment the name of the ICN Interest message with the control flag from the first packet.

14. The computer-readable non-transitory medium of claim 12, wherein the instructions when executed are further operable to:
encapsulate the control flag in the payload field of the second packet.

15. The computer-readable non-transitory medium of claim 12, wherein the control flag comprises one or more of a SYN, ACK, SYN-ACK, NACK, or FIN flag.

16. The computer-readable non-transitory medium of claim 12, wherein the instructions when executed are further operable to:
determine that the first packet includes a data payload; and
determine to encapsulate the data from the first packet into an ICN Data message based on the presence of data payload in the first packet; and
wherein transmitting the second packet comprises transmitting the ICN Data message.

17. The computer-readable non-transitory medium of claim 12, wherein encapsulating one or more TCP headers from the first packet into a payload field of a second packet comprises:
determining that a number of TCP data segments in a TCP queue has reached a threshold number of segments; and
encapsulating a predetermined number of TCP data segments in a payload field the second packet, wherein the second packet is an ICN Data message.

18. The computer-readable non-transitory medium of claim 12, wherein the instructions when executed are further operable to:
receive one or more ICN Interest messages;
add the one or more ICN Interest messages to an Interest queue;
identify an oldest ICN Interest message in the Interest queue; and
use a name of the oldest ICN Interest message in the Interest queue as a name for the second packet.

19. The computer-readable non-transitory medium of claim 18, wherein the instructions when executed are further operable to:
determine that all of the ICN Interest messages in the Interest queue have expired;
transmit a wake up message to a network node hosting a reverse proxy through the ICN network,
receive one or more ICN Interest messages based on the wake up message; and
store the one or more ICN Interest messages in the Interest queue.

20. The computer-readable non-transitory medium of claim 12, wherein the instructions when executed are further operable to:
receive an ICN data message from a network node hosting a forward proxy through the ICN network;
decapsulate the ICN data message to extract TCP /IP header information and TCP data payload from a payload of the ICN data message;
determine a destination for the TCP data payload; and
transmit the TCP data payload as a TCP packet to the destination.

21. The computer-readable non-transitory medium of claim 12, wherein the instructions when executed are further operable to:
determine an ICN name for routing the second packet based on a domain name service (DNS) lookup using TCP/IP information in the first packet; and
use the ICN name as a routing prefix for the second packet.

22. The computer-readable non-transitory medium of claim 12, wherein the instructions when executed are further operable to:
record ACK numbers for traffic routed through the network node;
receive a data packet comprising a data payload and an ACK number that is higher than a highest recorded ACK number;
send an ICN Interest message to a reverse proxy hosted by a network node through the ICN network requesting an Interest message from the reverse proxy;

receive an ICN Interest message from the reverse proxy; and use the ICN Interest message to encapsulate the data packet as an ICN data packet for routing through the ICN network.

23. A network element, the network element comprising:
at least one memory element having instructions stored thereon;
at least one processors coupled to the at least one memory element and configured to execute the instructions to cause the network element to:
receive a first packet at the network node, the first packet compliant with a Transmission Control Protocol (TCP) protocol;
encapsulate one or more TCP headers from the first packet into a payload field of a second packet, the second packet compliant with an Information Centric Networking (ICN) protocol; and
transmit the second packet to a destination through an ICN network
wherein the instructions cause the network element to:
determine that the first packet does not have a data payload;
identify a control flag from the first packet; and
determine to encapsulate the control flag from the first packet into an ICN Interest message based on the lack of payload in the first packet; and
wherein transmitting the second packet comprises transmitting the ICN Interest message.

24. The network element of claim 23, wherein the instructions cause the network element to:
identify a name for the ICN Interest message for routing the ICN Interest message;
augment the name of the ICN Interest message with the control flag from the first packet.

25. The network element of claim 23, wherein the instructions when executed are further operable to: encapsulate the control flag in the payload field of the second packet.

26. The network element of claim 23, wherein the control flag comprises one or more of a SYN, ACK, SYN-ACK, NACK, or FIN flag.

27. The network element of claim 23, wherein the instructions cause the network element to:
determine that the first packet includes a data payload; and
determine to encapsulate the data from the first packet into an ICN Data message based on the presence of data payload in the first packet; and
wherein transmitting the second packet comprises transmitting the ICN Data message.

28. The network element of claim 23, wherein encapsulating one or more TCP headers from the first packet into a payload field of a second packet comprises:
determining that a number of TCP data segments in a TCP queue has reached a threshold number of segments; and
encapsulating a predetermined number of TCP data segments in a payload field the second packet, wherein the second packet is an ICN Data message.

29. The network element of claim 23, wherein the instructions cause the network element to:
receive one or more ICN Interest messages;
add the one or more ICN Interest messages to an Interest queue;
identify an oldest ICN Interest message in the Interest queue; and
use a name of the oldest ICN Interest message in the Interest queue as a name for the second packet.

30. The network element of claim 29, wherein the instructions cause the network element to:
determine that all of the ICN Interest messages in the Interest queue have expired;
transmit a wake up message to a network node hosting a reverse proxy through the ICN network,
receive one or more ICN Interest messages based on the wake up message; and
store the one or more ICN Interest messages in the Interest queue.

31. The network element of claim 23, wherein the instructions cause the network element to:
receive an ICN data message from a network node hosting a forward proxy through the ICN network;
decapsulate the ICN data message to extract TCP/IP header information and TCP data payload from a payload of the ICN data message;
determine a destination for the TCP data payload; and
transmit the TCP data payload as a TCP packet to the destination.

32. The network element of claim 23, wherein the instructions cause the network element to:
determine an ICN name for routing the second packet based on a domain name service (DNS) lookup using TCP/IP information in the first packet; and
use the ICN name as a routing prefix for the second packet.

33. The network element of claim 23, wherein the instructions cause the network element to:
record ACK numbers for traffic routed through the network node;
receive a data packet comprising a data payload and an ACK number that is higher than a highest recorded ACK number;
send an ICN Interest message to a reverse proxy hosted by a network node through the ICN network requesting an Interest message from the reverse proxy;
receive an ICN Interest message from the reverse proxy; and
use the ICN Interest message to encapsulate the data packet as an ICN data packet for routing through the ICN network.

34. A method performed in a network node, the method comprising:
receiving a first packet at the network node, the first packet compliant with a Transmission Control Protocol (TCP) protocol;
encapsulating one or more TCP headers from the first packet into a payload field of a second packet, the second packet compliant with an Information Centric Networking (ICN) protocol; and
transmitting the second packet to a destination through an ICN network,
wherein encapsulating one or more TCP headers from the first packet into a payload field of a second packet comprises:
determining that a number of TCP data segments in a TCP queue has reached a threshold number of segments; and
encapsulating a predetermined number of TCP data segments in a payload field the second packet, wherein the second packet is an ICN Data message.

35. A method performed in a network node, the method comprising:
receiving a first packet at the network node, the first packet compliant with a Transmission Control Protocol (TCP) protocol;

encapsulating one or more TCP headers from the first packet into a payload field of a second packet, the second packet compliant with an Information Centric Networking (ICN) protocol;
transmitting the second packet to a destination through an ICN network;
receiving one or more ICN Interest messages;
adding the one or more ICN Interest messages to an Interest queue;
identifying an oldest ICN Interest message in the Interest queue that has not expired; and
using a name of the oldest ICN Interest message in the Interest queue as a name for the second packet.

* * * * *

UNITED STATES PATENT AND TRADEMARK OFFICE
CERTIFICATE OF CORRECTION

| | | |
|---|---|---|
| PATENT NO. | : 10,158,570 B2 | Page 1 of 1 |
| APPLICATION NO. | : 15/263639 | |
| DATED | : December 18, 2018 | |
| INVENTOR(S) | : Ilya V. Moiseenko et al. | |

It is certified that error appears in the above-identified patent and that said Letters Patent is hereby corrected as shown below:

In the Claims

Claim 23, Column 17, Line 20, please replace "network" with --network,--

Signed and Sealed this
Twenty-ninth Day of January, 2019

Andrei Iancu
*Director of the United States Patent and Trademark Office*